United States Patent
Burrow et al.

(10) Patent No.: US 8,009,589 B2
(45) Date of Patent: *Aug. 30, 2011

(54) SUBNET MANAGEMENT IN VIRTUAL HOST CHANNEL ADAPTER TOPOLOGIES

(75) Inventors: Stephen R. Burrow, Austin, TX (US); Richard K. Errickson, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 529 days.

This patent is subject to a terminal disclaimer.

(21) Appl. No.: 12/037,046

(22) Filed: Feb. 25, 2008

(65) Prior Publication Data

US 2009/0213753 A1 Aug. 27, 2009

(51) Int. Cl.
*H04L 12/28* (2006.01)
(52) U.S. Cl. ........................................ 370/254
(58) Field of Classification Search .................. None
See application file for complete search history.

(56) References Cited

U.S. PATENT DOCUMENTS

| | | | |
|---|---|---|---|
| 3,643,227 A | 2/1972 | Smith et al. | |
| 5,170,472 A | 12/1992 | Cwiakala et al. | |
| 5,339,413 A | 8/1994 | Koval et al. | |
| 5,343,867 A | 9/1994 | Shankar | |
| 5,388,266 A | 2/1995 | Frey et al. | |
| 5,524,212 A | 6/1996 | Somani et al. | |
| 5,777,987 A | 7/1998 | Adams et al. | |
| 6,073,181 A | 6/2000 | Holland et al. | |
| 6,181,677 B1 | 1/2001 | Valli et al. | |
| 6,289,386 B1 | 9/2001 | Vangemert | |
| 6,363,457 B1 * | 3/2002 | Sundberg | 711/114 |
| 6,483,804 B1 | 11/2002 | Muller et al. | |
| 6,507,567 B1 | 1/2003 | Willars | |
| 6,741,552 B1 | 5/2004 | McCrosky et al. | |
| 6,862,609 B2 | 3/2005 | Merkey | |
| 6,993,032 B1 | 1/2006 | Dammann et al. | |
| 7,093,024 B2 | 8/2006 | Craddock et al. | |
| 7,200,704 B2 * | 4/2007 | Njoku et al. | 710/316 |
| 7,283,473 B2 * | 10/2007 | Arndt et al. | 370/231 |
| 7,290,077 B2 * | 10/2007 | Gregg et al. | 710/263 |
| 7,366,813 B2 | 4/2008 | Gregg et al. | |
| 7,467,402 B2 | 12/2008 | Pennington et al. | |
| 7,602,774 B1 | 10/2009 | Sundaresan et al. | |
| 7,613,183 B1 | 11/2009 | Brewer et al. | |
| 2001/0014954 A1 | 8/2001 | Purcell et al. | |
| 2001/0030943 A1 | 10/2001 | Gregg et al. | |

(Continued)

OTHER PUBLICATIONS

Jeong et al.; A study on TCP Buffer Management Algorithim for Improvement on Network Performance in Grid Environment; 2004 pp. 281-288.

(Continued)

*Primary Examiner* — Ayaz R Sheikh
*Assistant Examiner* — Blanche Wong
(74) *Attorney, Agent, or Firm* — Cantor Colburn LLP; Steven Chiu

(57) ABSTRACT

A computer program product for subnet management in virtual host channel adapter topologies includes a tangible storage medium readable by a processing circuit and storing instructions for execution by the processing circuit for performing a method. The method includes receiving a request to add a new logical host channel adapter (HCA) to the subnet, updating a logical switch port topology control block to reflect a pointer to the new logical HCA, and updating a port topology control block of the logical HCA to reflect a pointer to the logical switch port.

17 Claims, 7 Drawing Sheets

U.S. PATENT DOCUMENTS

| | | | |
|---|---|---|---|
| 2002/0107903 A1 | 8/2002 | Richter et al. | |
| 2002/0194245 A1 | 12/2002 | Simpson et al. | |
| 2003/0005039 A1 | 1/2003 | Craddock et al. | |
| 2003/0018828 A1* | 1/2003 | Craddock et al. | 709/321 |
| 2003/0061379 A1 | 3/2003 | Craddock et al. | |
| 2004/0123068 A1 | 6/2004 | Hashimoto | |
| 2004/0202189 A1 | 10/2004 | Arndt et al. | |
| 2004/0221070 A1 | 11/2004 | Ortega, III et al. | |
| 2005/0018669 A1 | 1/2005 | Arndt et al. | |
| 2005/0060445 A1* | 3/2005 | Beukema et al. | 710/52 |
| 2005/0120237 A1 | 6/2005 | Roux et al. | |
| 2005/0144313 A1 | 6/2005 | Arndt et al. | |
| 2006/0048214 A1 | 3/2006 | Pennington et al. | |
| 2006/0176167 A1 | 8/2006 | Dohrmann | |
| 2006/0230185 A1 | 10/2006 | Errickson et al. | |
| 2006/0230209 A1 | 10/2006 | Gregg et al. | |
| 2006/0230219 A1* | 10/2006 | Njoku et al. | 710/316 |
| 2007/0239963 A1 | 10/2007 | Yao et al. | |
| 2007/0245050 A1 | 10/2007 | Gregg et al. | |
| 2008/0028116 A1 | 1/2008 | Gregg et al. | |
| 2008/0109891 A1 | 5/2008 | Greenwald et al. | |
| 2008/0196041 A1 | 8/2008 | Gregg et al. | |
| 2009/0094603 A1 | 4/2009 | Hiltgen et al. | |

OTHER PUBLICATIONS

Huang et al., InfiniBand Support in Xen Virtual Machine Environmant, Technical Report, OSU-CISRC-10/05-TR63, Oct. 2005.

"Infiniband Architecture Specification vol. 1", Release 1.0.a, Jun. 19, 2001, pp. 40, 71, 193-194, 366-370, 665-667.

Wu et al., "Design of an InfiniBand Emulator over Myrinet: Challenges, Implementation, and Performance Evaluation", Technical Report, OSU-CISRC-2/01-TR03, 2003.

Office Action made Final dated Dec. 8, 2010 for U.S. Appl. No. 12/036,986.

Non-Final Office Action dated Jun. 23, 2010 for U.S. Appl. No. 12/036,986.

Non-Final Office Action dated Jan. 29, 2010 for U.S. Appl. No. 12/036,979.

Notice of Allowance dated Jun. 23, 2010 for U.S. Appl. No. 12/036,979.

Office Action made Final dated Oct. 6, 2010 for U.S. Appl. No. 12/037,048.

Non-Final Office Action dated Apr. 9, 2010 for U.S. Appl. No. 12/037,048.

Office Action Made Final dated Aug. 12, 2010 for U.S. Appl. No. 12/051,634.

Non-Final Office Action dated Mar. 22, 2010 for U.S. Appl. No. 12/051,634.

Non-Final Office Action dated May 13, 2010 for U.S. Appl. No. 12/051,631.

Notice of Allowance dated Oct. 15, 2010 for U.S. Appl. No. 12/051,631.

Final Office dated Nov. 12, 2010 for U.S. Appl. No. 12/051,630.

Non-Fianl Office Action dated Jun. 1, 2010 for U.S. Appl. No. 12/051,630.

Non-Final Office Action dated Mar. 22, 2011 for U.S. Appl. No. 12/036,983.

Advisory Action dated Feb. 16, 2011 for U.S. Appl. No. 12/036,986.

* cited by examiner

SUBNET MANAGEMENT IN VIRTUAL HOST CHANNEL ADAPTER TOPOLOGIES

BACKGROUND OF THE INVENTION

1. Field of Invention

The present disclosure relates generally to network management, and in particular, to subnet management in virtual host channel adapter topologies.

2. Description of Background

InfiniBand® Architecture (IBA) is an industry standard architecture for connecting complex systems. Particularly, InfiniBand® (IB), which is a form of System Area Network (SAN), defines a multicast facility that allows a Channel Adapter (CA) to send a packet to a single address and have it delivered to multiple ports. The InfiniBand® Architecture is described in the InfiniBand® standard, which is available at http://www.infinibandta.org, and also hereby incorporated in its entirety by reference.

BRIEF SUMMARY OF THE INVENTION

An exemplary embodiment includes a computer program product for subnet management in virtual host channel adapter topologies. The computer program product includes a tangible storage medium readable by a processing circuit and storing instructions for execution by the processing circuit for performing a method. The method includes receiving a request to add a new logical host channel adapter (HCA) to the subnet, updating a logical switch port topology control block to reflect a pointer to the new logical HCA, and updating a port topology control block of the logical HCA to reflect a pointer to the logical switch port.

Another exemplary embodiment includes an apparatus for subnet management in virtual host channel adapter topologies. The apparatus includes a logical switch representation of at least one physical port, wherein the logical switch representation is managed through a subnet management agent. The apparatus further includes a logical host channel adapter (HCA) representation of at least one host channel adapter, wherein the logical HCA representation is managed by the subnet management agent. The apparatus further includes a logical connection between the logical switch representation and the logical HCA representation configured to enable communications between the host channel adapter and the physical port, wherein the communications are managed through a subnet management interface in communication with the subnet management agent.

A further exemplary embodiment includes a method for subnet management in virtual host channel adapter topologies. The method includes receiving a request to add a new logical host channel adapter (HCA) to the subnet, updating a logical switch port topology control block to reflect a pointer to the new logical HCA, and updating a port topology control block of the logical HCA to reflect a pointer to the logical switch port Other articles of manufacture, apparatuses, and/or methods according to embodiments will be or become apparent to one with skill in the art upon review of the following drawings and detailed description. It is intended that all such additional articles of manufacture, apparatuses, and/or methods be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
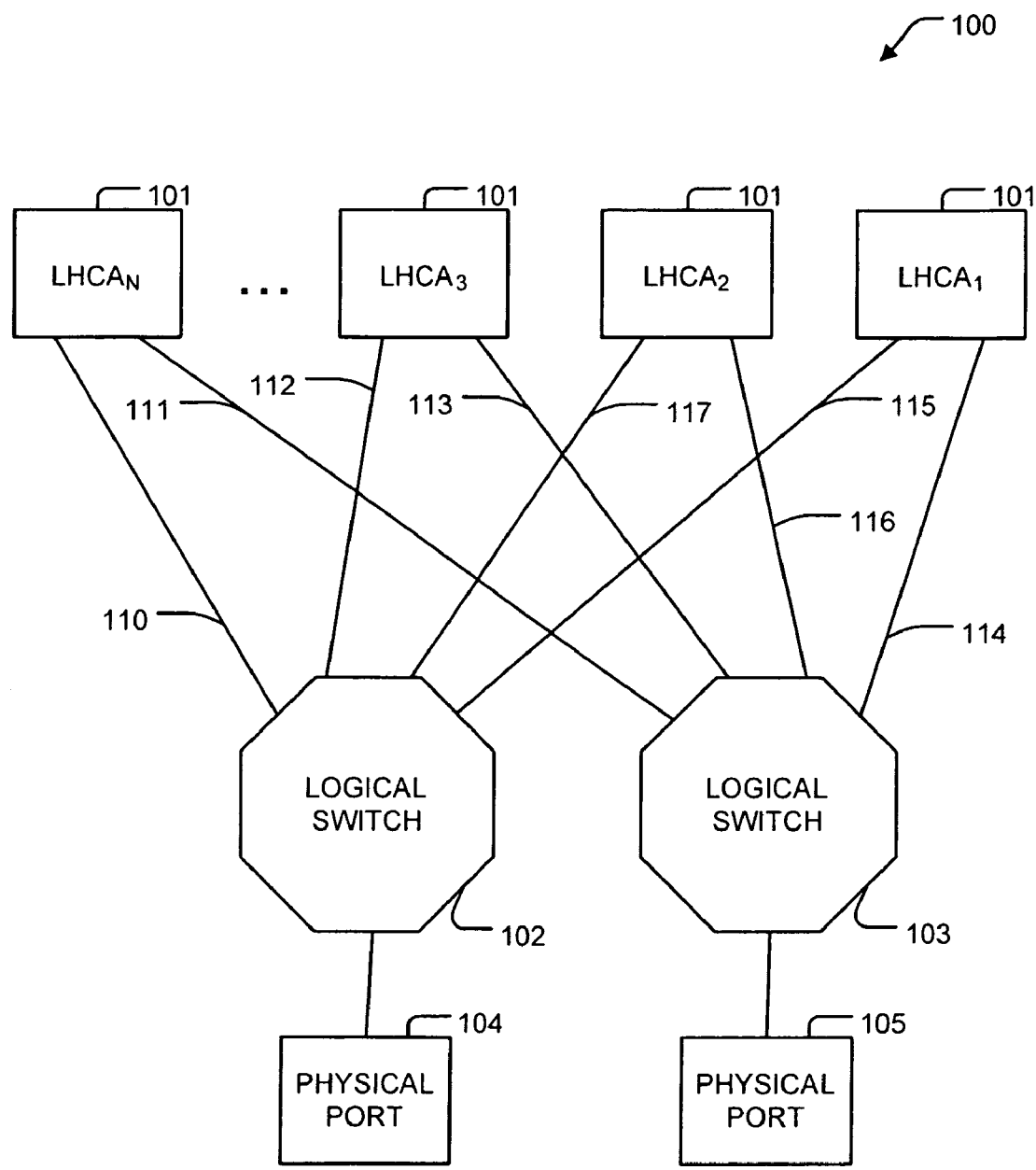
FIG. 1 illustrates logical entities of a network topology, according to an example embodiment.

The detailed description explains the preferred embodiments of the invention, together with advantages and features, by way of example with reference to the drawings.

DETAILED DESCRIPTION OF THE INVENTION

Detailed illustrative embodiments are disclosed herein. However, specific functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of this disclosure and the associated claims.

It should be understood that, although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting of example embodiments.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Hereinafter, example embodiments of the present invention will be described in detail. An example embodiment of the present invention provides a method of subnet management in virtual host channel adapter topologies. Technical effects of example embodiments include the ability to manage the topology of logical switches and logical host channel adapters within the boundaries of a physical host channel adapter. The topology may be managed through use of a series of linked port topology control blocks connecting various nodes as additional logical host channel adapters become active. Each port topology structure (e.g., control block) may include a node type, a port number associated with the node, a corresponding physical port number, a switch or host channel adapter number, a zone number associated with a logical partition including the node, and a pointer to a next node.

The InfiniBand® Architecture (IBA) defines a fabric (or IBA fabric) as a collection of links, switches, and routers that connects a set of channel adapters. IBA defines two types of channel adapters, Host Channel Adapters (HCA) and Target Channel Adapters (TCA). Host channel adapters provide an interface between a processor complex and the IBA fabric, while target channel adapters provide an interface between the IBA fabric and an I/O device.

IBA supports logical partitioning (LPAR) and LPAR environments. The term LPAR applies to both the concept of Logical Partitioning and to an LPAR image itself. A physical HCA (pHCA) provides several hardware facilities that manage the isolation between individual LPARs. Implementing the logical partitioning of a single pHCA uses the concept of multiple logical host channel adapters (LHCAs) connected by one or more logical switches (LSwitches).

The InfiniBand® Fabric Interface (IBFI) refers to communication entities that attach to the LSwitch. These communication entities may be functionally defined as a logical host channel adapter (LHCA), which is the default definition used herein.

The HCA system implementation to support LPAR results in each physical port of the HCA presenting the image of a logical switch (LSwitch). In addition to the LSwitch port that corresponds to the physical port of the HCA, the LSwitch has a port for each defined LPAR image in the physical node. Each first level guest may have access to the physical HCA (pHCA) via a logical host channel adapter (LHCA). LHCAs are the logical representation of a physical Host Channel Adapter (pHCA). A LHCA provides a means in which shared access to HCA resources are managed (e.g., Queue Pairs, Completion Queues, Event Queues, Memory Regions) as observed by an operating system (OS). The LHCA represents all the elements and attributes of a physical HCA. LHCAs have one logical port (LPort) for each physical port of the HCA, and therefore each LSwitch. There may be no connections between LSwitches in network topologies of an HCA system. The entities of an example network topology are illustrated in FIG. 1.

Turning to FIG. 1, entities of a network topology are illustrated. The network 100 may include a plurality of logical host channel adapters (LHCAs 1 . . . N) 101. As described above, each LHCA may represent all the attributes of a physical host channel adapter. The network 100 further includes a plurality of logical switches (102-103). As illustrated, each logical switch 102 and 103 includes a connection or mapping to a physical port 104 and 105, respectively. Therefore, a logical switch may provide a means to utilize a physical port through logical mapping.

As further illustrated in FIG. 1, each logical switch 102 and 103 includes a port for each LHCA of the network 100. Each port is illustrated through simplified connections 110-117. Furthermore, each LHCA 101 includes a separate port for each logical switch 102 and 103 illustrated through the simplified connections 110-117. Therefore, each simplified connection of connections 110-117 may represent a connection between logical ports of each entity (i.e., each LHCA and logical switch). Additionally, the logical port connections may be grouped into subnets. Hereinafter, a more detailed explanation of subnets is provided.

A subnet is defined as a set of InfiniBand Architecture (IBA) ports and associated links that have a common Subnet ID and are managed by a common Subnet Manager. The IBA defines a Subnet Manager (SM) as an entity attached to a subnet that is responsible for configuring and managing switches, routers, and channel adapters. The SM is the entity that is responsible for the topology and connectivity of nodes throughout the subnet.

The SM communicates with a Subnet Management Agent (SMA) which resides at each node. The communication between the SM and SMA is performed using a special class of Management Datagram (MAD) called a Subnet Management Packet (SMP) which is directed to a special queue pair 0 (QP0). All other management traffic may utilize queue pair 1 (QP1). There may be two types of SMPs, Local ID (LID) Routed and Directed Route SMPs. LID routed SMPs are forwarded through the subnet based on the LID of the destination. Directed route SMPs are forwarded through the subnet based on a vector of port numbers that define a path through the subnet. Directed route SMPs are used to implement several management functions, for example, before LIDs are assigned to the nodes.

The Subnet Management Interface (SMI) is associated with QP0. QP0 is used exclusively for sending and receiving SMPs, whether they are destined for the SM or the SMA at the node. Communications with the SMA in a channel adapter, switch, or router is always through the SMI. Only SMAs and SM communicate through this interface.

Figure 2:
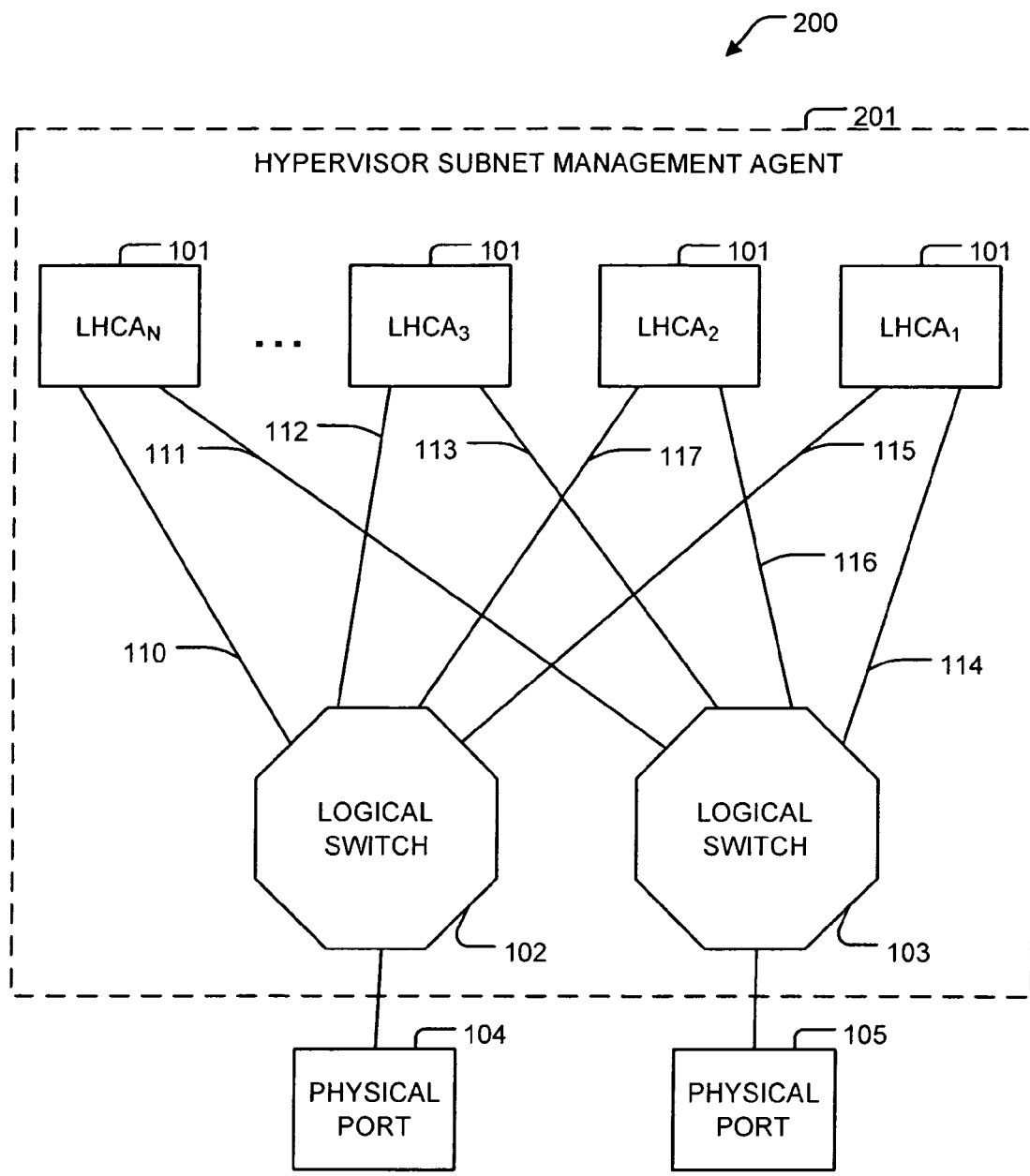
FIG. 2 illustrates a hypervisor subnet management interface, according to an example embodiment.

According to example embodiments, because a Host Channel Adapter (HCA) appears to the IB fabric as a multitude of nodes, the SMI for each of these nodes is a single shared SMI, termed the hypervisor SMI (hSMI). Turning to FIG. 2, an hSMI is illustrated, according to an example embodiment.

According to FIG. 2, the hSMI 200 includes all logical entities (nodes) associated in the subnet. For example, all QP0 traffic that arrives at a node within the physical HCA (pHCA) is first routed to the hSMI. The hSMI function owns the receive queue of the queue pair 0 (QP0) for each physical port (pPort) of the physical HCA (pHCA). Because there can be only one real QP0, the HCA uses real QP0 for physical port 104 and real QP2 (alias QP0) for pPort 105.

Likewise, each of these nodes within the pHCA is considered to have its own SMA. According to example embodiments, all of the SMA entities are implemented in the hypervisor code, and are collectively referred to as the hypervisor SMA (hSMA) 201.

It is the responsibility of the hSMA 201 to respond to the SM in such a way that it is impossible to distinguish the logical switches and logical HCAs defined by the HCA Architecture, from real physical IB switches and HCAs.

Figure 3:
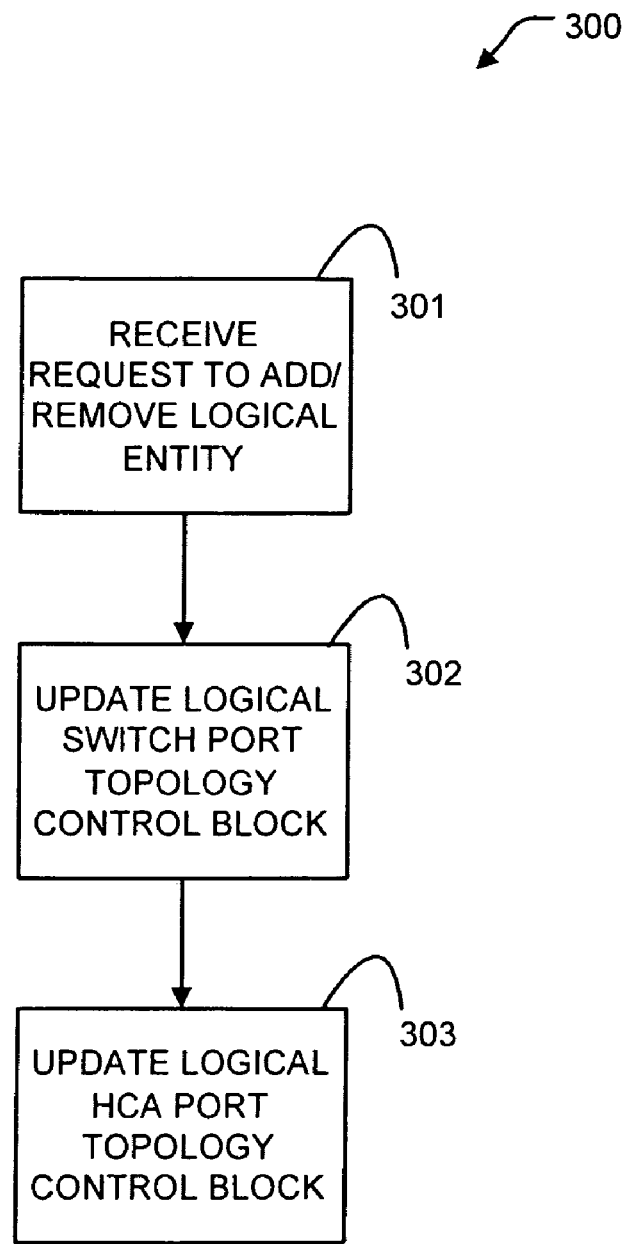
FIG. 3 illustrates a method for subnet management in virtual host channel adapter topologies, according to an example embodiment.

Turning to FIG. 3, a method for subnet management in virtual host channel adapter topologies is illustrated. The topology, or roadmap, of logical switches and host channel adapters within the boundaries of a physical host channel adapter may be managed according to the method 300. As illustrated, the method 300 includes receiving a request to add or remove a logical entity from a subnet at block 301. For example, a request may be received from a physical device being activated or a logical partition becoming active within the boundaries of a physical host channel adapter. Upon receipt of the request, the method 300 includes updating a logical switch port topology control block at block 302.

For example, a port topology structure (control block) of a node may include a (node) type (LSwitch or LHCA), a port number of the node, a corresponding physical port (pPort) number, a switch or HCA number, a zone number associated with a particular LPAR, and/or a pointer to a next node. Thus, a pointer may be added to the port topology control block of a logical switch to the new entity in block 302. An example Table 1 is provided below which sets forth an exemplary format for a port topology control block according to the above description:

TABLE 1

Port Topology Control Block Example Layout

| Byte 0 | Byte 1 | Byte 2 | Byte 3 | Byte 4 | Byte 5 | Byte 6 | Byte 7 |
|---|---|---|---|---|---|---|---|
| port | | sw num | hca number | | | pPort | adapter_id |
| rzone | | | | | type | | |
| | | | Pointer to next node | | | | |

Turning back to FIG. 3, the method 300 further includes updating a logical HCA port topology control block at block 303. For example, a pointer to the logical switch may be added within the control block structure of the new entity in block 303.

According to example embodiments, the number of LSwitch port topology control blocks N per physical HCA (PHCA) may be represented by:

$$N=P*(L+1) \qquad \text{Equation 1}$$

According to Equation 1, P represents the number of pPorts per physical HCA (pHCA), and L represents the total number of LSwitch ports (not including switch management port 0). Storage may be allotted for the total number of port topology control blocks within a hypervisor subnet management agent of the subnet (e.g., hSMA 201). Upon allocating this storage, the hSMA will add a pointer to an hSMA Master Directory. According to example embodiments, one master directory may be included within each hSMA.

For example, if the master directory's pointer (termed plSW_Port_Topology_cb for specificity herein) points to the start of this block of storage, the port topology control block for a logical switch (LSwitch) port q (of L total ports numbered 0 to L) and physical port p (of P total ports numbered 1 to P) may be accessed. The address of a specific LSwitch Port Topology control block is specified by:

$$hSMA\_cb = plSW\_Port\_Topology\_cb + ((L+1)*(p-1))+q \qquad \text{Equation 2}$$

According to Equation 2, P represents the total number of Physical Ports (pPorts) per physical HCA (pHCA), L represents the total number of LSwitch ports (not including switch management port 0), p represents the Physical port number (numbered 1 to P), and q represents the LSwitch port number (numbered 0 to L).

Additionally, the number of LHCA port topology control blocks M per physical HCA (pHCA) may be represented by:

$$M=P*n \qquad \text{Equation 3}$$

According to Equation 3, P represents the total number of Physical Ports (pPorts) per physical HCA (pHCA) and n represents the maximum number of LPARs supported.

Storage may be allotted for the total number of port topology control blocks within a hypervisor subnet management agent of the subnet (e.g., hSMA 201). Upon allocating this storage, the hSMA will add a pointer to an hSMA Master Directory. According to example embodiments, one master directory may be included within each hSMA.

For example, if a master directory pointer (termed plHCA_Port_Topology_cb for specificity herein) points to the start of this block of storage, the port topology control block for a logical port (LPort) on a LHCA for LPAR image i (of n total images not to exceed 253 numbered 0 to n−1) and physical port p (of P total ports numbered 1 to P) may be accessed.

It is noted that the LPort number on a LHCA should match the physical port number (pPort) of the physical HCA.

Additionally, the address of a specific LHCA Port Topology control block for a LPAR is specified by:

$$hSMA\_cb = plHCA\_Port\_Topology\_cb + (n*(p-1))+i \qquad \text{Equation 4}$$

According to Equation 4, P represents the total number of Physical Ports (pPorts) per physical HCA (pHCA), L represents the total number of LSwitch ports (not including switch management port 0), p represents the Physical port number (numbered 1 to P), and represents the LPAR image number (numbered 0 to n−1).

As entities (i.e. LHCAs) are added to the subnet topology of the physical HCA, the methodologies described herein add the associated logical link(s) between the LSwitch port and the corresponding LHCA port. For example, the methodologies include updating the LSwitch Port Topology control block (see FIG. 3, 302), setting the pPort field to the associated physical port number, the port number (i.e. port 65) that will be logically connected to the added node (the LHCA port), the type is set to specify a LSwitch, the rzone is set to the LPAR number, and the 'pointer to next node' is set to point to the attached node's Port Topology control block. Likewise, the LHCA Port Topology control block is updated (see FIG. 3, 303) setting the pPort field to the associated physical port number, the port number (i.e. port 1) that will be logically connected to the added node (the LSwitch port), the type is set to specify a LHCA, the rzone is set to the LPAR number, and the 'pointer to next node' is set to point to the attached node's Port Topology control block.

Figure 4:
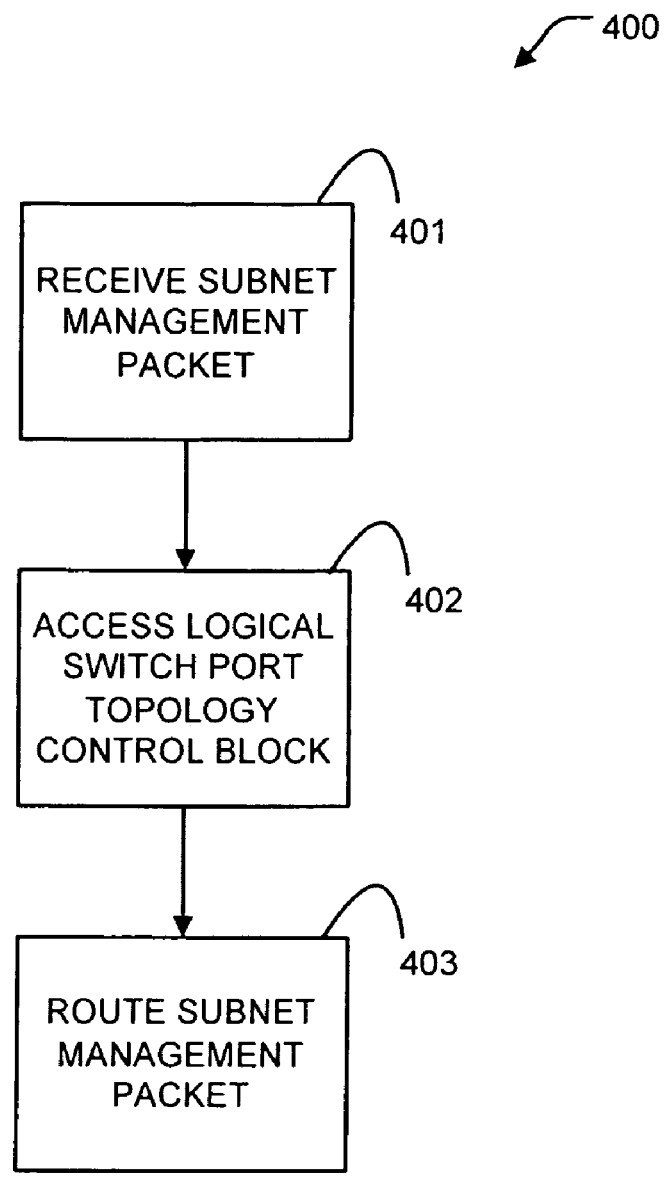
FIG. 4 illustrates a method for subnet management in virtual host channel adapter topologies, according to an example embodiment.

It is noted that using the anticipated series of updated port topology control blocks, messages (e.g., SMP) may be distributed among various nodes of the subnet topology. For example, as set forth in FIG. 4, a method for subnet management in virtual host channel adapter topologies is illustrated, according to an example embodiment.

The method 400 includes receiving a subnet management packet at block 401. For example, the subnet management packet may be transmitted from a node within the subnet. The subnet management packet may be received by a hypervisor subnet management interface of the subnet. The method 400 further includes accessing a logical switch port topology control block at block 402. For example, upon receipt of the subnet management packet, the hypervisor subnet management interface may access a port topology control block to interpret a destination for the subnet management packet. Upon interpretation, the method 400 includes routing the subnet management packet to the interpreted destination at block 403. Hereinafter, an example subnet management scenario is discussed with reference to FIGS. 5A-5B.

Figure 5A:
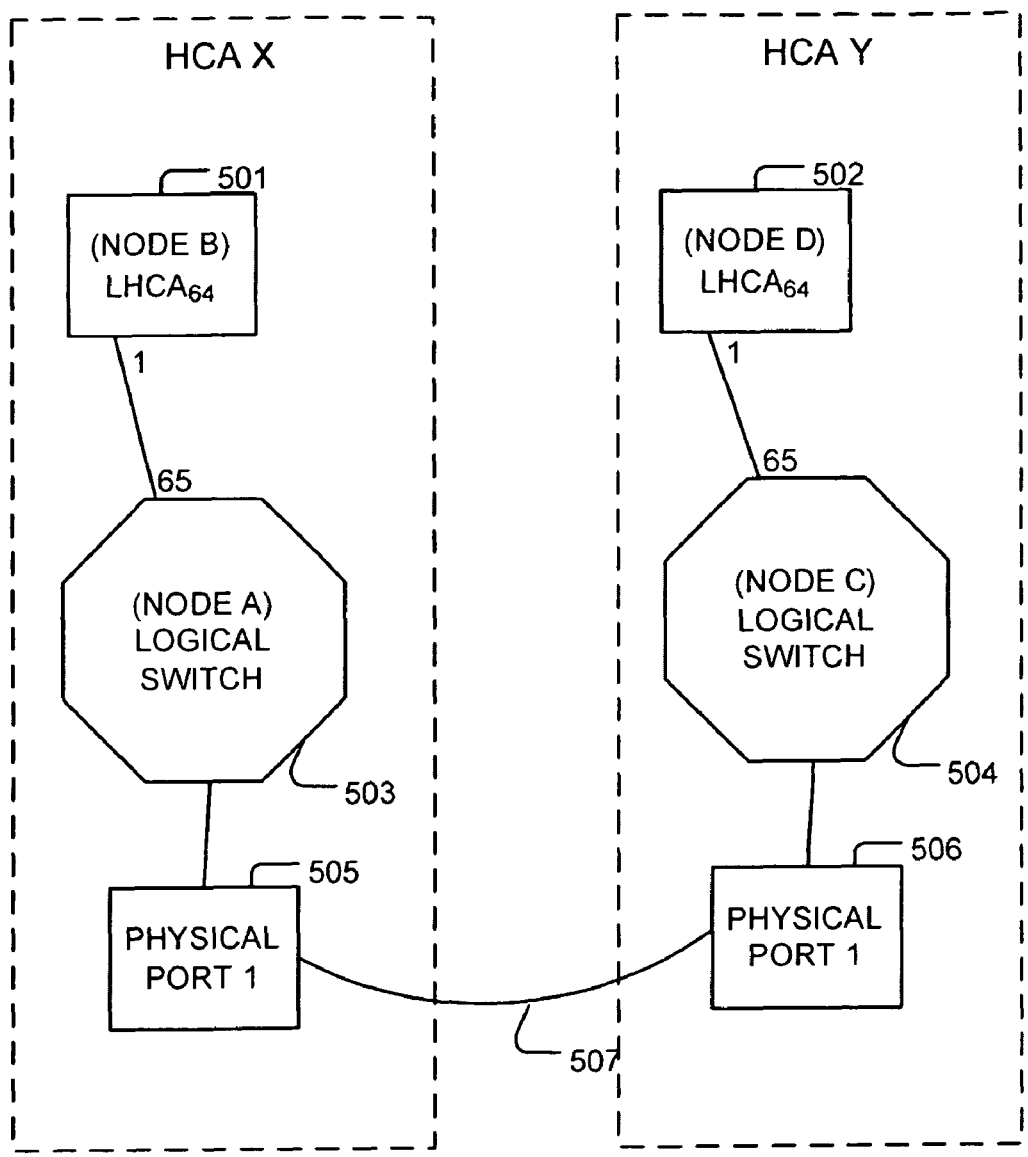
FIG. 5A illustrates an example network topology, according to an example embodiment.

Turning to FIG. 5A, an example network topology is illustrated. FIG. 5A is given for illustrative purposes only, and should not be construed as limiting. In the example network topology, a communications link 507 operatively connects a pPort 505 of HCA X to a pPort 506 of HCA Y. A SM residing on the LSwitch on HCA X (Node A) may have completed discovery of local LSwitch 503 (Node A), local $LHCA_{64}$ 501 (Node B), and the remote LSwitch 504 on HCA Y (Node C). In addition, the SM may have discovered that the remote LSwitch 504 (Node C) has 65 ports, with ports 2 through 64 being unavailable, and with port 65 available. However, the SM on LSwitch 503 may transmit a directed route SMP with a hop count of two targeting the node (Node D) attached to the remote LSwitch 504 port 65 to discover the node attached to the active port 65. The hop count indicates how many directed route hops to take.

The SMP is received at the hSMI on HCA Y, and the hSMI directs the SMP to the appropriate node. For example, the first hop directs the SMP to the remote LSwitch and the second hop directs the SMP to exit the remote LSwitch at port 65. The hSMI may access the Port Topology control block (HCA Y) for port 65 of the LSwitch and target the node pointed to by the "pointer to next node" field. In this example, the hSMI may have forwarded the SMP packet to port 1 of $LHCA_{64}$ (Node D). The hSMI may have then passed this packet off to the hSMA for further processing.

If the hSMA is ready to send back a response SMP, the response packet arrives at the hSMI at $LHCA_{64}$ port 1 (Node D). The hop count is set to two to match the request packet from the SM. Because the SMP is a directed route packet, the hSMI may access the Port Topology control block for $LHCA_{64}$ port 1 (Node D) to determine where to forward the packet for the first hop.

The $LHCA_{64}$ Port Topology control block points to port 65 of the LSwitch (Node C) associated with pPort 506 on HCA Y. After making the first hop, the hSMI determines that there is one hop remaining, and the next port in the return path field in the SMP identifies port 1. Thus hSMI must force the SMP packet out the physical port (pPort) 506 of the HCA Y. For example, FIG. 5B illustrates port topology control blocks 510 as described herein before, which may contain pointers to different nodes.

Figure 5B:
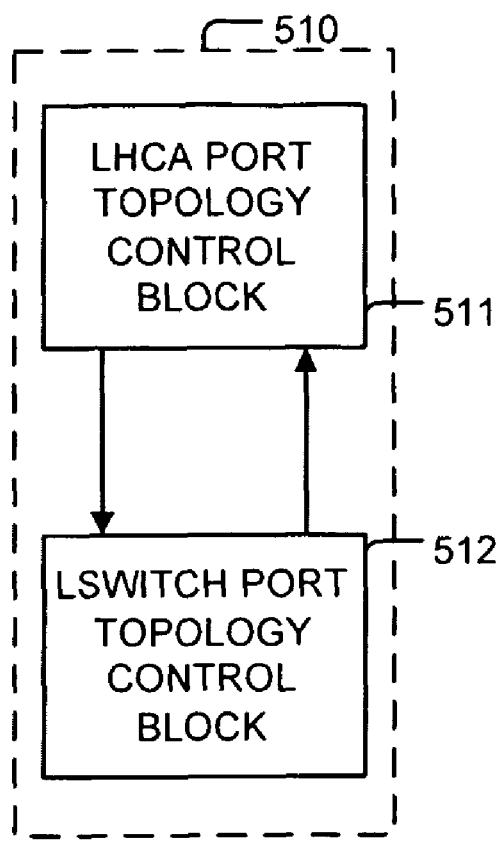
FIG. 5B illustrates port topology control blocks, according to an example embodiment.

As illustrated in FIG. 5B, a LHCA port topology control block 511 may point to an LSwitch port topology control block 512. Therefore, any SMP directed to the LHCA containing LHCA control block 511 may be directed with the aid of the pointer from LSwitch port topology control block 512. Similarly, any SMP directed from the LHCA containing LHCA control block 511 may be directed with the aid of the pointer from LHCA control block 511.

Figure 6:
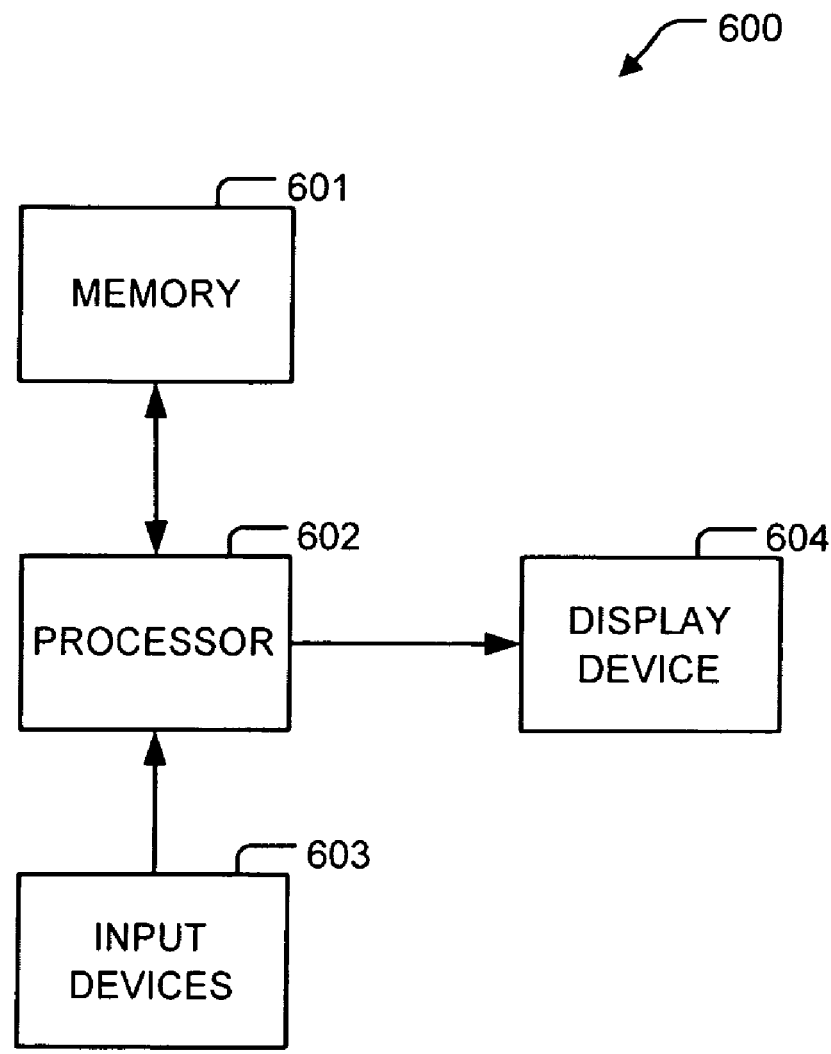
FIG. 6 illustrates a computer apparatus, according to an example embodiment.

It is further noted that embodiments of the invention may be embodied in the form of computer-implemented processes and apparatuses for practicing those processes. Therefore, according to an exemplary embodiment, the methodologies described hereinbefore may be implemented by a computer system or apparatus. For example, FIG. 6 illustrates a computer apparatus, according to an exemplary embodiment. Therefore, portions or the entirety of the methodologies described herein may be executed as instructions in a processor 602 of the computer system 600. The computer system 600 includes memory 601 for storage of instructions and information, input device(s) 603 for computer communication, and display device 604. Thus, the present invention may be implemented, in software, for example, as any suitable computer program on a computer system somewhat similar to computer system 600. For example, a program in accordance with the present invention may be a computer program product causing a computer to execute the example methods described herein.

The computer program product may include a computer-readable medium having computer program logic or code portions embodied thereon for enabling a processor (e.g., 602) of a computer apparatus (e.g., 600) to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

Further, such programs, when recorded on computer-readable storage media, may be readily stored and distributed. The storage medium, as it is read by a computer, may enable the method(s) disclosed herein, in accordance with an exemplary embodiment of the present invention.

With example embodiments of the present invention having thus been described, it will be obvious that the same may be varied in many ways. The description of the invention hereinbefore uses these examples, including the best mode, to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Such variations are not to be regarded as a departure from the spirit and scope of the present invention, and all such modifications are intended to be included within the scope of the present invention as stated in the following claims.

What is claimed is:

1. A computer program product for subnet management in virtual host channel adapter topologies, the computer program product including a non-transitory computer readable storage medium including computer executable instructions that, when executed by a processor, direct the processor to perform a method, the method comprising:
    receiving a request to add a new logical host channel adapter (HCA) to a subnet from the new logical HCA;
    updating a logical switch port topology control block of the subnet to reflect a pointer to the new logical HCA; and
    updating a port topology control block of the new logical HCA to reflect a pointer to the logical switch port topology control block.

2. The computer program product of claim 1, wherein the method further comprises:
    receiving a subnet management packet;
    accessing the logical switch port topology control block to interpret destination information for the subnet management packet; and
    routing the subnet management packet based on the destination information.

3. The computer program product of claim 2, wherein the subnet management packet is received at a hypervisor subnet management interface configured to manage the subnet.

4. The computer program product of claim 2, wherein accessing the logical switch port topology control block includes interpreting a destination from pointer entries within the logical switch port topology control block.

5. The computer program product of claim 2, wherein routing the subnet management packet includes directing the subnet management packet to a node of the subnet.

6. The computer program product of claim 1, wherein the tangible storage medium includes a rewriteable non-volatile storage medium, a flash storage medium, a hard disk, an optical storage medium, a magneto-optic storage medium, or a magnetic storage medium.

7. The computer program product of claim 1, wherein updating the logical switch port topology control block includes writing pointer information to a pointer field of the logical switch port topology control block configured to direct subnet management packets to the new logical HCA.

8. The computer program product of claim 1, wherein updating the port topology control block of the new logical HCA includes writing pointer information to a pointer field of the port topology control block configured to direct subnet management packets to a logical switch.

9. An apparatus for subnet management in virtual host channel adapter topologies, the apparatus comprising:
   at least one processor;
   a logical switch representation of at least one physical port, wherein the logical switch representation is managed through a subnet management agent;
   a logical host channel adapter (HCA) representation of at least one host channel adapter, wherein the logical HCA representation is managed by the subnet management agent; and
   a logical connection between the logical switch representation and the logical HCA representation configured to enable communications between the host channel adapter and the physical port, wherein the communications are managed through a subnet management interface in communication with the subnet management agent.

10. A computer-implemented method for subnet management in virtual host channel adapter topologies, the method comprising:
    receiving a request to add or remove a new logical host channel adapter (HCA) to a subnet from the new logical HCA;
    updating a logical switch port topology control block of the subnet to reflect a pointer to the new logical HCA; and
    updating a port topology control block of the new logical HCA to reflect a pointer to the logical switch port topology control block.

11. The method of claim 10, wherein the method further comprises:
    receiving a subnet management packet;
    accessing the logical switch port topology control block to interpret destination information for the subnet management packet; and
    routing the subnet management packet based on the destination information.

12. The method of claim 11, wherein the subnet management packet is received at a hypervisor subnet management interface configured to manage the subnet.

13. The method of claim 11, wherein accessing the logical switch port topology control block includes interpreting a destination from pointer entries within the logical switch port topology control block.

14. The method of claim 11, wherein routing the subnet management packet includes directing the subnet management packet to a node of the subnet.

15. The method of claim 10, wherein tangible storage medium includes a rewriteable non-volatile storage medium, a flash storage medium, a hard disk, an optical storage medium, a magneto-optic storage medium, or a magnetic storage medium.

16. The method of claim 10, wherein updating the logical switch port topology control block includes writing pointer information to a pointer field of the logical switch port topology control block configured to direct subnet management packets to the new logical HCA.

17. The method of claim 10, wherein updating the port topology control block of the logical HCA includes writing pointer information to a pointer field of the port topology control block configured to direct subnet management packets to a logical switch.

* * * * *